Aug. 13, 1929.  C. L. DAY  1,724,460
LOCK NUT
Filed Nov. 22, 1928
Fig.1.
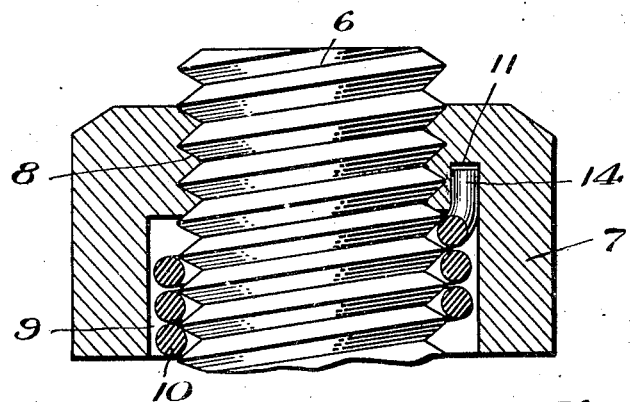
Fig.2.
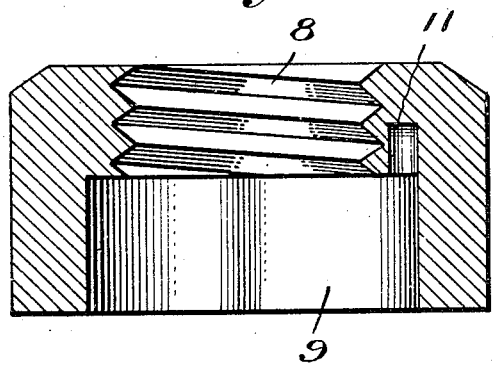
Fig.3.
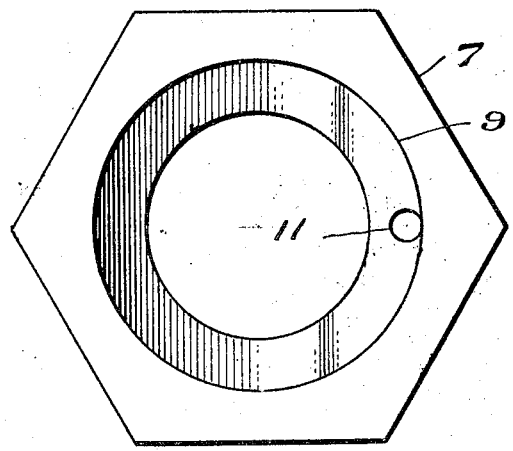
Fig.4.
Fig.5.
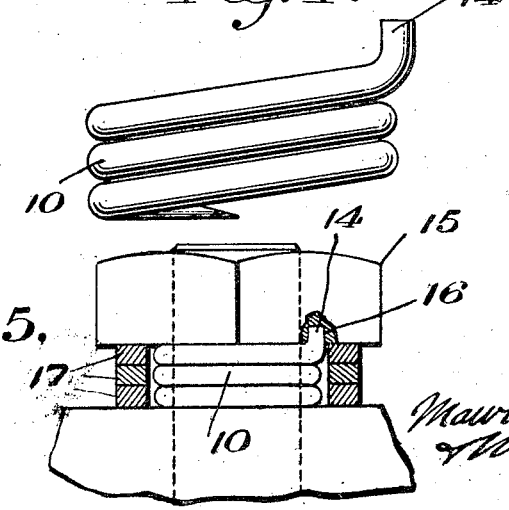
Inventor
C. L. Day Patented Aug. 13, 1929.

1,724,460

UNITED STATES PATENT OFFICE.

CHARLES L. DAY, OF NEW YORK, N. Y.

LOCK NUT.

Application filed November 22, 1928. Serial No. 321,145.

The present invention relates to improvement in lock nut and has for an object to provide an improved lock nut which involves no modification of the standard bolt and which may be readily and without interference screwed upon the bolt but will positively prevent any casual or accidental backward turning of the nut until such time as its removal may be required.

Another object of the invention is to provide an improved lock nut which is constructed to avoid any weakening of the nut structure, which involves only slight modifications from standard practice in the making of the nut and in which simplicity and economy of manufacture are preserved.

With the foregoing and other objects in view the invention will be more fully described hereinafter and more particularly pointed out in the appended claim.

In the drawings, in which like symbols refer to like or corresponding parts through the several views:

Figure 1 is a cross-sectional view taken through the improved nut shown as applied to a bolt indicated in fragmentary side view.

Figure 2 is a cross-sectional view of the nut with the spring removed.

Figure 3 is an end view of the nut with the spring removed.

Figure 4 is a side view of the improved spring employed, and

Figure 5 is a partial side and sectional view showing a modification.

Referring more particularly to Figures 1 to 4 inclusive, 6 designates the usual standard bolt, having threads of any desired pitch; and 7 represents a nut having the usual threaded bore 8 adapted to screw upon the bolt 6. In accordance with the present invention, the nut is provided with a counterbore 9 of larger diameter than the diameter of the threaded bore 8 and communicates therewith. Such counterbore 9 opens on the inner side of the nut whereby a coil spring 10 may be introduced into the counterbore through such end. The convolutions of the spring 10 will be such as to fit the pitch of the bolt 6 so that adjacent helices of the spring engage in adjacent threads of said bolt 6, as shown in Figure 1. A recess 11 is made in the nut at the base of the counterbore, such recess opening through the counterbore but such recess does not extend to the outer wall of the nut 7 which is preserved of a uniform fixed diameter throughout the entire circumference of the nut to avoid weakening of the main body portion of the nut and to prevent the accumulation or entrance of dirt or other foreign material.

This recess is designed to receive a tang 14 turned outwardly from the outer end of the spring 10. In Figure 1 the tang 14 is shown as occupying the recess 11. The tang 14 is turned in a direction parallel to the axis of the bolt and of the spring 10, and it projects at substantially right angles from the outermost convolution of the spring 10 to facilitate its shearing when the lock is to be broken and the nut removed from the bolt.

As shown in Figures 1, 2, 3 and 5 the recess 11 may be round and it somewhat closely receives the tang 14 of the spring 10 and does not communicate with the threaded bore of the nut 7. The dividing wall or thickness of the nut between the threaded base and the recess 11 serves to prevent the end or tang 14, either in initial or sheared condition, from jamming between the nut and the thread of the bolt, and makes shearing easier.

In operation, as the nut is turned on to the bolt, the recess 11 engaging the tang 14 will compel the spring to be turned along with the nut, tending to open the spring slightly so that it will take readily on the threads of the bolt 6 and follow them until the nut is screwed home. The spring 10 thereupon jams between the threads and the nut and holds the nut in place, the spring tightening on the bolt should the nut start to back off, the recess 11 engaging the tang 14 and tending to constrict the spring 10 about the threads of the bolt 6. In order to release the nut it is necessary to shear off the tang 14. In doing so the leverage usually supplied with a wrench will be adequate for this purpose.

A new spring can readily be inserted when the nut is again put on the bolt. The turning of the tang 14 outwardly will cause a rearrangement of the molecules which will tend to make the shearing operation easier.

In accordance with a modification shown in Figure 5, the usual form of nut 15 may be employed having a recess 16 in its inner face to receive the tang 14 of the spring 10 already described and shown in Figure 4. A number of washers or a sleeve 17 may be fitted about the bolt and against the inner face of the nut 15 in order to envelop the spring 10 and provide a housing therefor. The operation of this device is substantially the same as that already described.

I wish it understood that I reserve the right to make changes in the size, form and proportion of parts provided such changes fall within the scope of the following claim.

What I claim and desire to secure by Letters Patent is:—

In combination with a threaded bolt, an improved lock nut comprising a nut body having an outer wall of uniform thickness throughout its circumference and provided with a threaded bore for engaging the threads of the bolt and with an enlarged counter bore opening on the inner face of the nut and having a recess in its face portion communicating with the counterbore and spaced outwardly from said threaded bore so that a separating wall is provided between the latter and the recess, and a coil spring occupying said counter bore with its convolutions wound about the threads of the bolt and having a tang bent forwardly at substantially right angles to the coil spring parallel to the axis of the nut and occupying the recess and maintained out of contact with the threaded bolt by said separating wall.

In testimony whereof I affix my signature.

CHARLES L. DAY.